(12) United States Patent
Kang et al.

(10) Patent No.: US 11,505,094 B2
(45) Date of Patent: Nov. 22, 2022

(54) SYSTEM AND METHOD FOR CONTROLLING MOVING CONSOLE OF SELF-DRIVING VEHICLE

(71) Applicant: HYUNDAI TRANSYS INC., Seosan-si (KR)

(72) Inventors: Sin Jeong Kang, Hwaseong-si (KR);
Duk Kyu Byun, Hwaseong-si (KR);
Seong Bin Jeong, Yongin-si (KR);
Byung Wan Bae, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 522 days.

(21) Appl. No.: 16/682,116

(22) Filed: Nov. 13, 2019

(65) Prior Publication Data

US 2020/0156553 A1 May 21, 2020

(30) Foreign Application Priority Data

Nov. 16, 2018 (KR) .................. 10-2018-0141401

(51) Int. Cl.
*B60N 2/14* (2006.01)
*B60R 7/04* (2006.01)
*B60N 2/06* (2006.01)
*B60N 2/005* (2006.01)
*B60N 2/02* (2006.01)

(52) U.S. Cl.
CPC .................. *B60N 2/14* (2013.01); *B60R 7/04* (2013.01); *B60N 2/0252* (2013.01); *B60N 2/06* (2013.01); *B60N 2002/0055* (2013.01); *B60N 2002/022* (2013.01); *B60N 2002/0272* (2013.01)

(58) Field of Classification Search
CPC .................. B60N 2/14; B60N 2/0252; B60N 2002/0055; B60N 2002/022; B60N 2002/0272; B60N 2/143; B60R 7/04
See application file for complete search history.

(56) References Cited

U.S. PATENT DOCUMENTS

| 5,611,589 A * | 3/1997 | Fujii .................. B60N 2/305 |
| | | 296/65.09 |
| 10,675,994 B2 * | 6/2020 | Fitzpatrick ............. B60N 2/14 |
| 10,710,473 B2 * | 7/2020 | Hagedorn ............. B60N 3/002 |
| 2016/0152163 A1 * | 6/2016 | Strasdat ............. B60R 11/0235 |
| | | 296/64 |
| 2017/0368964 A1 * | 12/2017 | Kim ........................ B60N 2/06 |
| 2018/0272900 A1 * | 9/2018 | Fitzpatrick ............ B60N 3/001 |
| 2019/0291617 A1 * | 9/2019 | Schlierf .................. B60N 2/20 |

FOREIGN PATENT DOCUMENTS

| EP | 1818212 A2 | 8/2007 |
| JP | 2005-096528 A | 4/2005 |
| JP | 2010-111178 A | 5/2010 |
| KR | 101852883 B1 | 4/2018 |
| WO | 2018/041289 A1 | 3/2018 |

* cited by examiner

*Primary Examiner* — David R Dunn
*Assistant Examiner* — Tania Abraham (57) ABSTRACT

Disclosed is a system and method for controlling a moving console. When a seat of a vehicle is moved forwards or rearwards, a console is automatically moved to a usable position adjacent to the seat, whereby it is possible for a passenger on the seat to conveniently use the console. In addition, when the seat is swiveled, the console is automatically moved to a position at which interference between the console and the seat is avoidable, whereby the seat is swiveled smoothly.

6 Claims, 6 Drawing Sheets

- INITIAL STATE -

- SEAT SWIVEL SWITCH ON -

- REARWARD MOVEMENT OF CONSOLE
(MOVEMENT FOR AVOIDING INTERFERENCE) -

SYSTEM AND METHOD FOR CONTROLLING MOVING CONSOLE OF SELF-DRIVING VEHICLE

CROSS-REFERENCE TO RELATED APPLICATION

This application claims, under 35 U.S.C. § 119(a), the benefit of priority to Korean Patent Application No. 10-2018-0141401 filed on Nov. 16, 2018, the entire contents of which are incorporated herein by reference.

BACKGROUND

(a) Technical Field

The present disclosure relates to a system and method for controlling a moving console of a self-driving vehicle, and more particularly to a system and method for controlling a moving console of a self-driving vehicle capable of performing control such that, when a seat of the self-driving vehicle is moved forwards and rearwards, a console is automatically moved to a usable position adjacent to the seat and such that, when the seat is swiveled, the console is automatically moved to a position at which interference between the console and the seat is avoidable.

(b) Background Art

A self-driving vehicle, which is capable of driving without driver input or manipulation, may be provided with a linearly movable and swivel type seat configured to be moved straight forwards and rearwards and to be swiveled in a desired direction for conference and conversation between multiple people, for looking at the scenery outside the vehicle, etc.

To this end, a base frame (a frame disposed at the bottom of a seat cushion) of the seat, which is provided in the self-driving vehicle, is mounted to a rail formed on a floor panel so as to be movable straight in the forward-rearward direction of a vehicle body, and the entire seat (a seat back and a seat cushion) is mounted on the base frame so as to be swiveled.

More specifically, a motor and mechanism for moving the seat forwards and rearwards are provided between the base frame and the rail in order to move the seat along the rail forwards and rearwards, and a motor and mechanism for swiveling the seat are provided between the base frame and the seat cushion in order to swivel the seat in a desired direction.

In addition, for the self-driving vehicle, a console that provides various convenient functions, such as article storage, an armrest, and a table, is disposed between a left seat and a right seat.

When the left seat or the right seat is moved forwards or rearwards and is thus displaced in the interior of the self-driving vehicle, however, the distance between the seat and the console increases, whereby a user may have difficulty in using the console.

Further, when the left seat or the right seat is swiveled, the seat may collide with the console, i.e. interference therebetween occurs, in the case in which the console is within the swivel track of the seat, which may then prevent the seat from being able to fully swivel.

Therefore, there is a necessity for a scheme that is capable of automatically moving the console to a shared position of the left seat or the right seat even when the left seat or the right seat is moved forwards or rearwards and is thus displaced in the interior of the self-driving vehicle, whereby it is possible to solve inconvenience in using the console, and that is capable of automatically moving the console out of the swivel track of the seat when the seat is swiveled, whereby it is possible to always swivel the seat smoothly.

The above information disclosed in this Background section is provided only for enhancement of understanding of the background of the disclosure and therefore it may contain information that does not form the prior art that is already known to a person of ordinary skill in the art.

SUMMARY OF THE DISCLOSURE

Certain embodiments of the present disclosure solve the above-described problems.

In an aspect of the present disclosure a system and method is provided for controlling a moving console of a self-driving vehicle capable of performing control such that, when a seat of the self-driving vehicle is moved forwards and rearwards, a console is automatically moved to a usable position adjacent to the seat, whereby it is possible for a passenger on the seat to always conveniently use the console, and such that, when the seat is swiveled, the console is automatically moved to a position at which interference between the console and the seat is avoidable, whereby the seat is swiveled smoothly.

The effects/objects of the present disclosure are not limited to those described above. The objects of the present disclosure will be clearly understood from the following description and could be implemented by means defined in the claims and a combination thereof.

One aspect of the present disclosure provides a system for controlling a moving console of a self-driving vehicle, the system including a console mounted to a console rail formed on a floor panel so as to be movable forwards and rearwards, a plurality of distance sensors mounted to four side surfaces of the console for sensing the distance between the console and the seat, a seat forward and rearward movement motor configured to be driven under the control of a controller when a seat forward and rearward movement switch is turned on in order to move a seat forwards and rearwards, a seat swivel motor configured to be driven under the control of the controller when a seat swivel switch is turned on in order to swivel the seat, and a console forward and rearward movement motor configured to be driven under the control of the controller in order to move the console forwards and rearwards, wherein, when the seat is moved forwards or rearwards as the result of driving of the seat forward and rearward movement motor, the console is automatically moved forwards or rearwards to a position at which the distance between the console and the seat is maintained within a predetermined distance as the result of driving of the console forward and rearward movement motor under the control of the controller, and, when the seat is swiveled as the result of driving of the seat swivel motor, the console is automatically moved forwards or rearwards to a position at which interference between the console and the seat is avoidable as the result of driving of the console forward and rearward movement motor under the control of the controller.

The controller may receive an ON signal of the seat forward and rearward movement switch and sensing signals of the distance sensors in real time, and, upon determining that the seat is far away from the console by a reference distance or more, may apply a driving control signal to the console forward and rearward movement motor in order to move the console forwards or rearwards.

The controller may receive the sensing signals of the distance sensors when the console is moved forwards or rearwards, and, upon determining that the seat is within the reference distance from the console, may perform control such that the console forward and rearward movement motor is stopped.

The controller may receive an ON signal of the seat swivel switch and sensing signals of the distance sensors in real time, and, upon determining that the distance between the console and the seat is within a predetermined swivel track range of the seat, may apply a driving control signal to the console forward and rearward movement motor in order to move the console forwards or rearwards.

The controller may receive the sensing signals of the distance sensors when the console is moved forwards or rearwards, and, upon determining that the console is out of the predetermined swivel track range of the seat, may perform control such that the console forward and rearward movement motor is stopped.

Another aspect of the present disclosure provides a method of controlling a moving console of a self-driving vehicle, the method including a plurality of distance sensors, mounted to four side surfaces of a console, sensing the distance between the console and a seat in real time and transmitting sensing signals to a controller, transmitting an ON signal of a seat forward and rearward movement switch to the controller, the controller applying a driving signal to a seat forward and rearward movement motor based on the ON signal of the seat forward and rearward movement switch such that the seat is moved forwards or rearwards, and, upon determining that the seat is far away from the console by a reference distance or more based on the sensing signals of the distance sensors, the controller applying a driving signal to a console forward and rearward movement motor such that the console is moved forwards or rearwards to a position adjacent to the seat that has already been moved forwards or rearwards.

The controller may receive the sensing signals of the distance sensors when the console is moved forwards or rearwards, and, upon determining that the seat is within the reference distance from the console, may perform control such that the console forward and rearward movement motor is stopped.

A further aspect of the present disclosure provides a method of controlling a moving console of a self-driving vehicle, the method including a plurality of distance sensors, mounted to four side surfaces of a console, sensing the distance between the console and a seat in real time and transmitting sensing signals to a controller, transmitting an ON signal of a seat swivel switch to the controller, the controller determining whether the distance between the console and the seat is within a predetermined swivel track range of the seat based on the sensing signals of the distance sensors, upon determining that the distance between the console is within the predetermined swivel track range of the seat, the controller applying a driving signal to a console forward and rearward movement motor such that the console is moved forwards or rearwards out of the predetermined swivel track range of the seat, and, upon determining that the console is out of the predetermined swivel track range of the seat as the result of forward or rearward movement of the console, the controller applying a driving signal to a seat swivel motor in order to swivel the seat.

The controller may receive the sensing signals of the distance sensors when the console is moved forwards or rearwards, and, upon determining that the console is out of the swivel track range of the seat, may perform control such that the console forward and rearward movement motor is stopped.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present disclosure, examples of which are illustrated in the accompanying drawings and described below. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art.

In addition, the term "unit" or "assembly" used herein signifies one unit that processes at least one function or operation, and may be realized by hardware, software, or a combination thereof.

In addition, relational terms, such as "first" and "second," are used in this specification only to distinguish between the same elements, and the elements are not limited as to the sequence therebetween in the following description.

Figure 1:
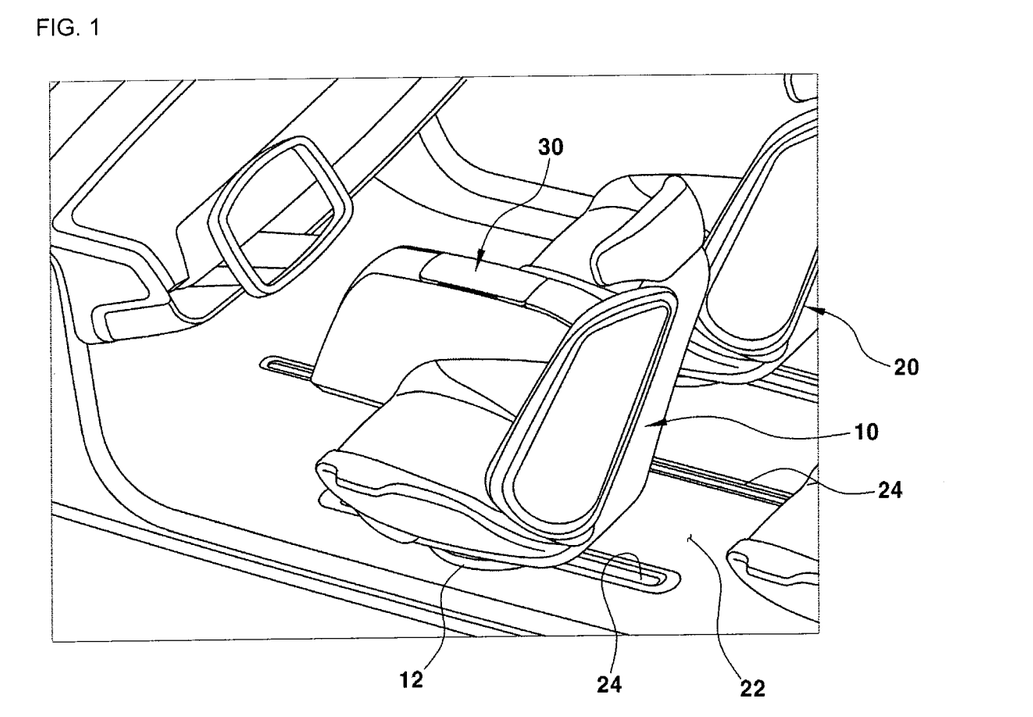
FIG. 1 is a schematic view showing an example in which seats and a console are disposed in the interior of a self-driving vehicle.

FIG. 1 is a schematic view showing an example in which seats and a console are disposed in the interior of a self-driving vehicle.

As shown in FIG. 1, since the forward-rearward movement, swivel operation, and reclining operation of each seat of the self-driving vehicle must be smoothly performed without interference in a limited interior space, the seat may be manufactured so as to have a slim structure that has a smaller volume than a conventional seat. In addition, a center console, disposed between left and right seats, may be configured so as to be movable in response to the movement and swivel operation of the seat.

That is, each of a left seat 10 and a right seat 20, disposed in a limited interior space of the self-driving vehicle, is preferably configured to have a slim structure such that the forward-rearward movement and swivel operation of the seat are easily performed, and a console 30, disposed between the left seat 10 and the right seat 20, is preferably automatically moved to a usable position adjacent to the seat when the seat is moved in the forward-rearward direction. In addition, the console is preferably automatically moved to a position at which the interference between the console and the seat is avoided when the seat is swiveled.

To this end, as shown in FIG. 1, a base frame 12 of each of the seats 10 and 20 of the self-driving vehicle is mounted to a rail 24 (e.g. a mono rail) formed on a floor panel 22 so as to be movable straight in the forward-rearward direction of a vehicle body, and the entire seat (a seat back and a seat cushion) is mounted on the base frame 12 so as to be swiveled.

In addition, the console 30 may also be mounted to a rail 24 (e.g. a mono rail) formed on the floor panel 22 so as to be movable forwards and rearwards.

For reference, a seat forward and rearward movement mechanism including a seat forward and rearward movement motor, a seat swivel mechanism including a seat swivel motor, and a console forward and rearward movement mechanism including a console forward and rearward movement motor may be variously designed and manufactured using a common rail, a common motor, and a common power transmission device arranged between the rail and the motor and have no relation to the essence of the present invention, and therefore a detailed description thereof will be omitted.

Figure 2:
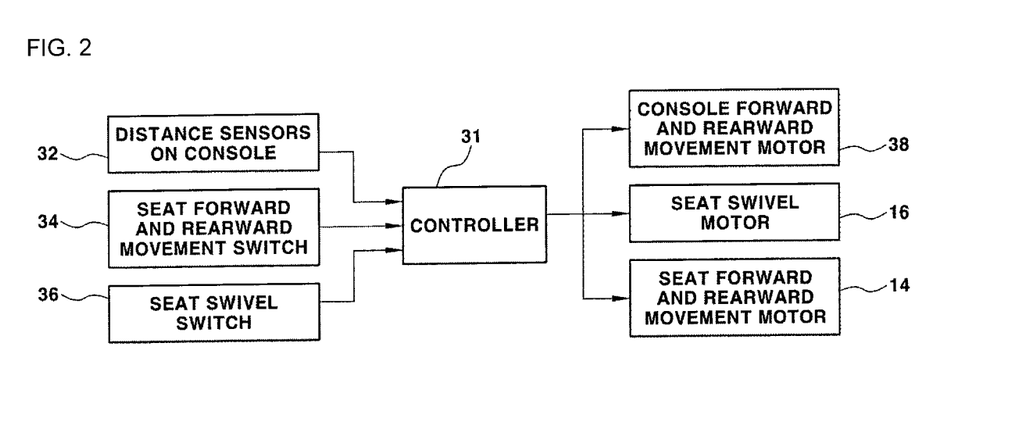
FIG. 2 is a view showing the construction of a system for controlling a moving console of a self-driving vehicle according to an aspect of the present disclosure.
Figure 3:
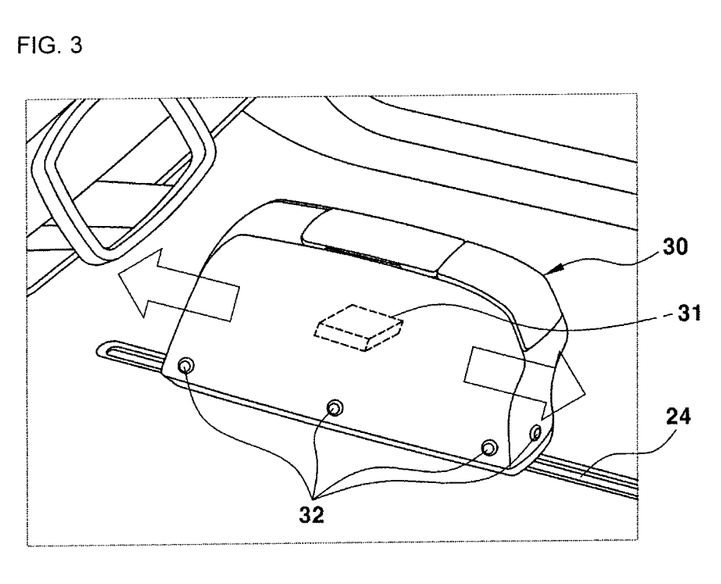
FIG. 3 is a schematic view showing an example in which a distance sensor is attached to a console, which is a component of the moving console control system according to an aspect of the present disclosure.

FIG. 2 is a view showing the construction of a system for controlling a moving console of a self-driving vehicle according to the present invention, and FIG. 3 is a schematic view showing an example in which a distance sensor is attached to a console, which is a component of the moving console control system according to an aspect of the present disclosure.

Referring to FIG. 3, the console 30 is mounted to the rail 24 formed on the floor panel so as to be movable forwards and rearwards, and a plurality of distance sensors 32 for sensing the distance between the console and the seat is mounted to four side surfaces of the console 30.

In addition, a controller 31 for receiving an on/off signal of a seat forward and rearward movement switch 34 and an on/off signal of a seat swivel switch 36 as well as sensing signals of the distance sensors 32 to control the movement of the console may be mounted in the console 30.

The seat forward and rearward movement switch 34 and the seat swivel switch 36 as well as the distance sensors 32 are connected to the input side of the controller 31 such that on/off signals can be transmitted.

In addition, a seat forward and rearward movement motor 14 for moving each of the seats 10 and 20 forwards and rearwards, a seat swivel motor 16 for swiveling each of the seats 10 and 20, and a console forward and rearward movement motor 38 for moving the console 30 forwards and rearwards may be connected to the output side of the controller 31 such that driving of each of the motors 14, 16, and 38 is controlled according to a control signal of the controller 31.

In an embodiment of the present disclosure, when one of the seats 10 and 20 or both of the seats 10 and 20 is/are moved forwards or rearwards as the result of driving of the seat forward and rearward movement motor 14, the console 30 may be automatically moved forwards or rearwards to a shared position at which the distance between the console 30 and each of the seats 10 and 20 is maintained within a predetermined distance as the result of driving of the console forward and rearward movement motor 38 under the control of the controller 31.

More specifically, the controller 31 may receive an ON signal of the seat forward and rearward movement switch 34 and sensing signals of the distance sensors 32 in real time, and, upon determining that the distance between the console and one or both of the seats 10 and 20 is equal to or exceeds a predetermined reference distance, may apply a driving control signal to the console forward and rearward movement motor 38 in order to move the console 30 forwards or rearwards. As a result, the console 30 may be automatically moved forwards or rearwards to the shared position at which the distance between the console 30 and each of the seats 10 and 20 is maintained within the predetermined reference distance, whereby a passenger on each of the seats may always be within a position to use the console, and therefore convenience in using the console may be improved.

At this time, the controller 31 receives sensing signals of the distance sensors 32 when the console 30 is moved forwards or rearwards, and, upon determining that each of the seats 10 and 20 is within the reference distance from the console 30, performs control such that the console forward and rearward movement motor 38 is stopped. As a result, the console is stopped at the usable position.

In another embodiment of the present disclosure, when one or both of the seats 10 and 20 is swiveled as the result of driving of the seat swivel motor 16, the console 30 may be automatically moved forwards or rearwards to a position at which interference between the console 30 and one or both of the seats 10 and 20 is avoided as the result of driving of the console forward and rearward movement motor 38 under the control of the controller 31.

More specifically, the controller 31 may receive an ON signal of the seat swivel switch 36 and sensing signals of the distance sensors 32 in real time, and, upon determining that the distance between the console 30 and one or both of the seats 10 and 20 is within a predetermined swivel track range of one or both of the seats 10 and 20, i.e. the console 30 is within the predetermined swivel track range of one or both of the seats 10 and 20, may apply a driving control signal to the console forward and rearward movement motor 38 in order to move the console 30 forwards or rearwards. As a result, the console 30 may be automatically moved forwards or rearwards such that the console 30 is out of the swivel track, whereby it is possible to prevent contact between the seat and the console 30 when one or both of the seats 10 and 20 is swiveled, and therefore the seat swivel operation may always be performed smoothly.

At this time, the controller 31 receives sensing signals of the distance sensors 32 when the console 30 is moved forwards or rearwards, and, upon determining that the console 30 is out of the predetermined swivel track range of each of the seats 10 and 20, performs control such that the console forward and rearward movement motor 38 is stopped. As a result, the console is stopped outside the swivel track range of each of the seats.

Hereinafter, a method of controlling the moving console of the self-driving vehicle according to the present disclosure will be described in more detail.

Figure 4:
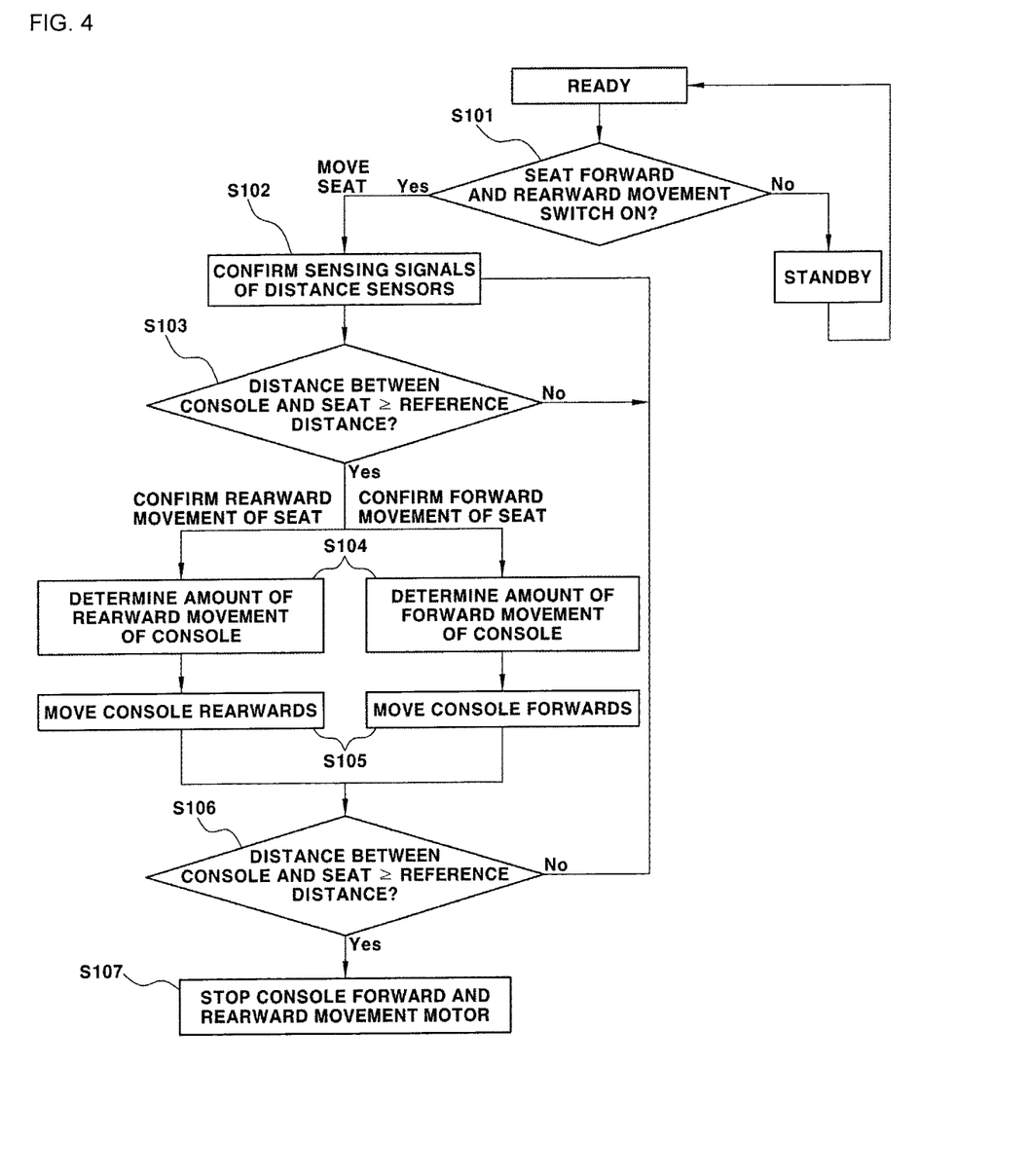
FIG. 4 is a flowchart showing a method of controlling a moving console of a self-driving vehicle according to an embodiment of the present disclosure.
Figure 5:
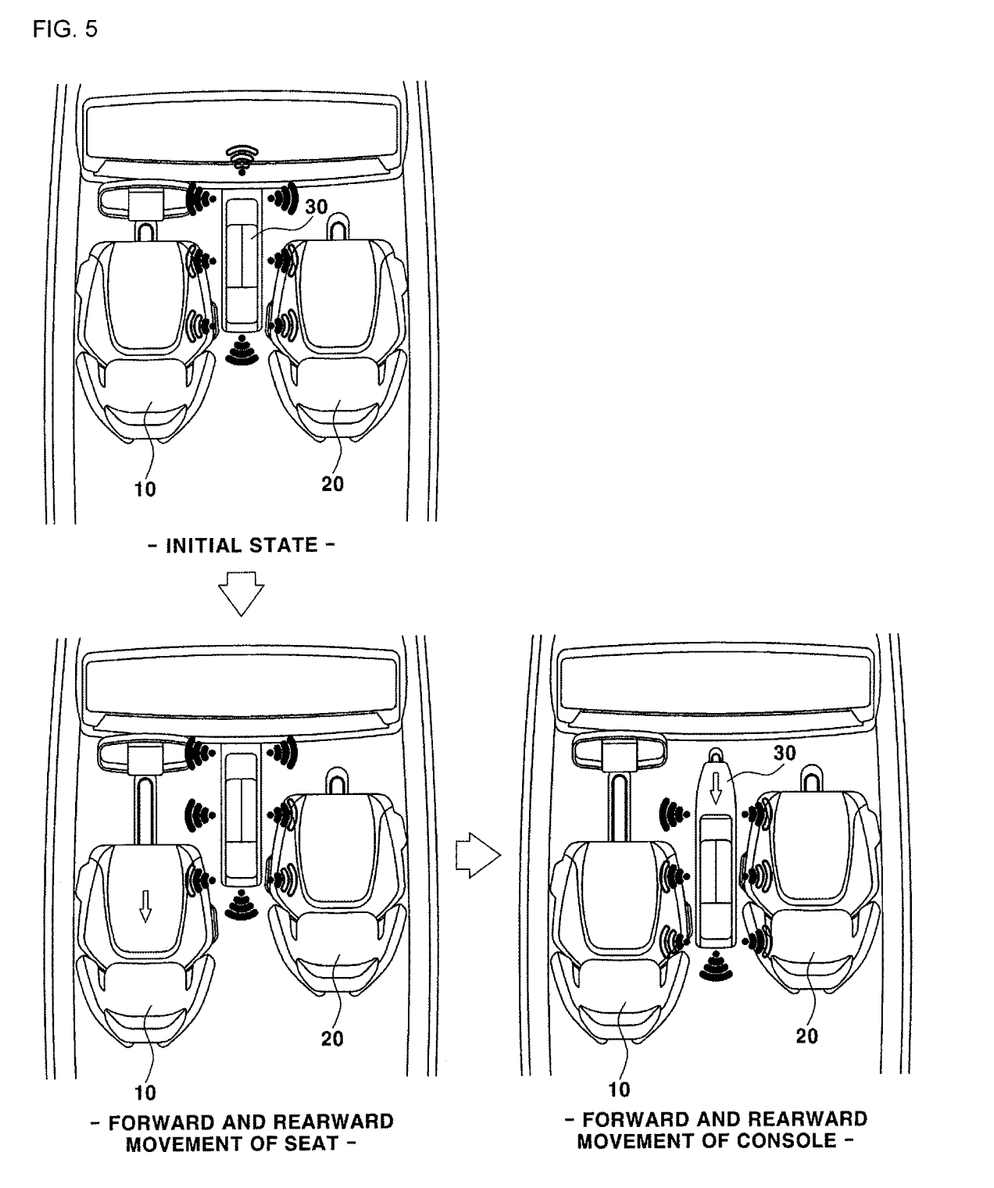
FIG. 5 is a plan view showing an example in which the console is moved by the method of controlling the moving console of the self-driving vehicle according to the embodiment of the present disclosure.

FIG. 4 is a flowchart showing a method of controlling a moving console of a self-driving vehicle according to an embodiment of the present disclosure, and FIG. 5 is a plan view showing an example in which the console is moved by the method of controlling the moving console of the self-driving vehicle according to the embodiment of the present disclosure.

As can be seen from an initial state of FIG. 5, in the state in which the console 30 is disposed between the left seat 10 and the right seat 20, the distance sensors 32, mounted to the four side surfaces of the console 30, sense the distance between the console 30 and each of the seats 10 and 20 in real time, and transmit sensing signals to the controller 31.

In this state, the controller 31 determines whether the seat forward and rearward movement switch 34 is ON or OFF (S101). Upon determining that the seat forward and rearward movement switch 34 is ON, the controller 31 confirms the sensing signals of the distance sensors 32 (S102).

At this time, the controller 31 applies a driving signal to the seat forward and rearward movement motor 14 based on the ON signal of the seat forward and rearward movement switch 34 such that the corresponding one of the seats 10 and 20 for which the ON signal is received (in this case, seat 10) is moved forwards or rearwards along the rail 24.

Subsequently, the controller 31 continuously confirms sensing signals of the distance sensors 32, and compares the distance between the console 30 and each of the seats 10 and 20 with a reference distance based on the signals (S103).

Upon determining that the distance between the console 30 and one or both of the seats 10 and 20 is equal to or greater than the predetermined reference distance (e.g., in the example show in FIG. 5, the distance between seat 10 and the console 30 is greater than the reference distance), the controller 31 determines a distance that the console 30 should be moved forwards or rearwards so that the console is within the reference distance (S104), and applies a driving signal to the console forward and rearward movement motor 38.

Subsequently, the console 30 is moved forwards or rearwards to a position adjacent to the seat that has already been moved forwards or rearwards as the result of driving of the console forward and rearward movement motor 38 (S105).

Subsequently, the controller 31 continuously receives sensing signals of the distance sensors 32 when the console 30 is moved forwards or rearwards, and, upon determining that each of the seats 10 and 20 is within the reference distance from the console 30 (S106), performs control such that the console forward and rearward movement motor is stopped (S107).

As described above, when one or both of the seats 10 and 20 of the self-driving vehicle is moved forwards and rearwards and is thus displaced, the console 30 may be automatically moved forwards or rearwards to a shared position at which the distance between the console 30 and each of the seats 10 and 20 is maintained within a predetermined distance, whereby it is possible for a passenger on each of the seats 10 and 20 to always conveniently use the console.

Figure 6:
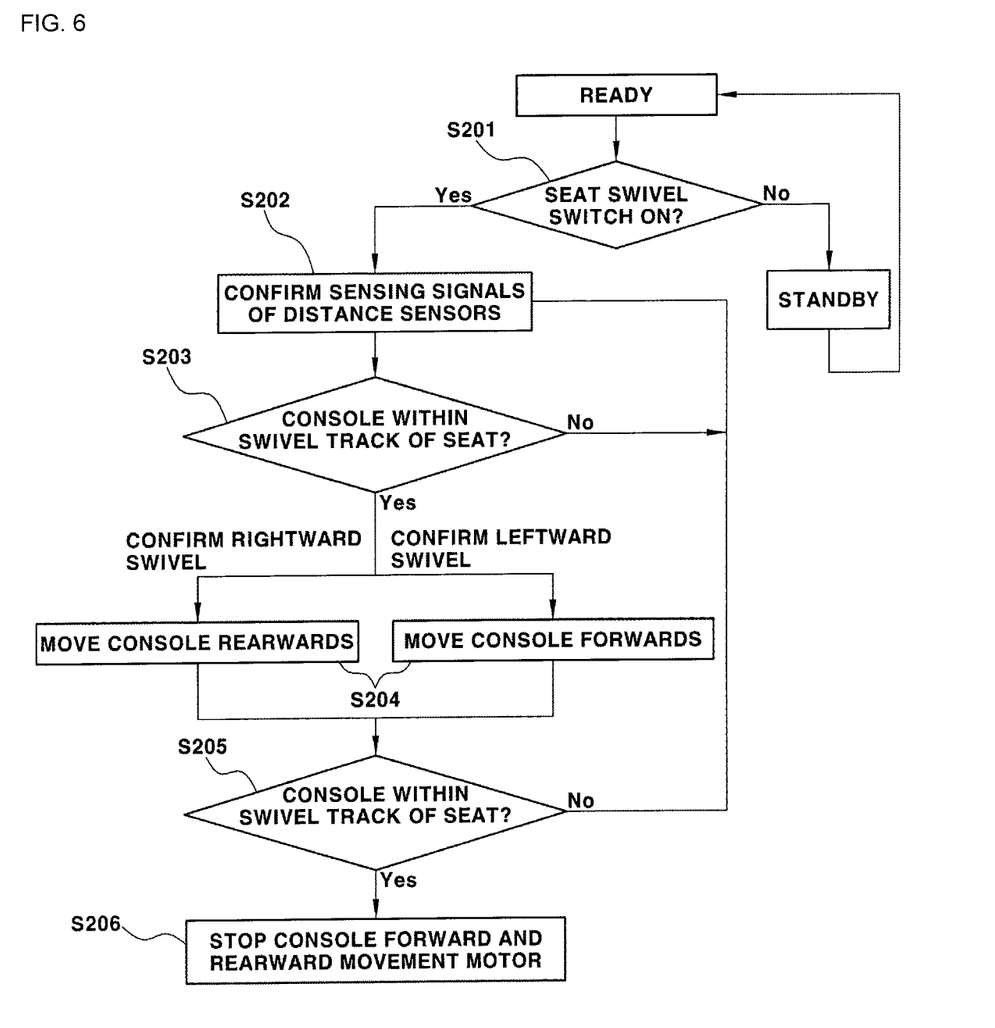
FIG. 6 is a flowchart showing a method of controlling a moving console of a self-driving vehicle according to an embodiment of the present disclosure.
Figure 7:
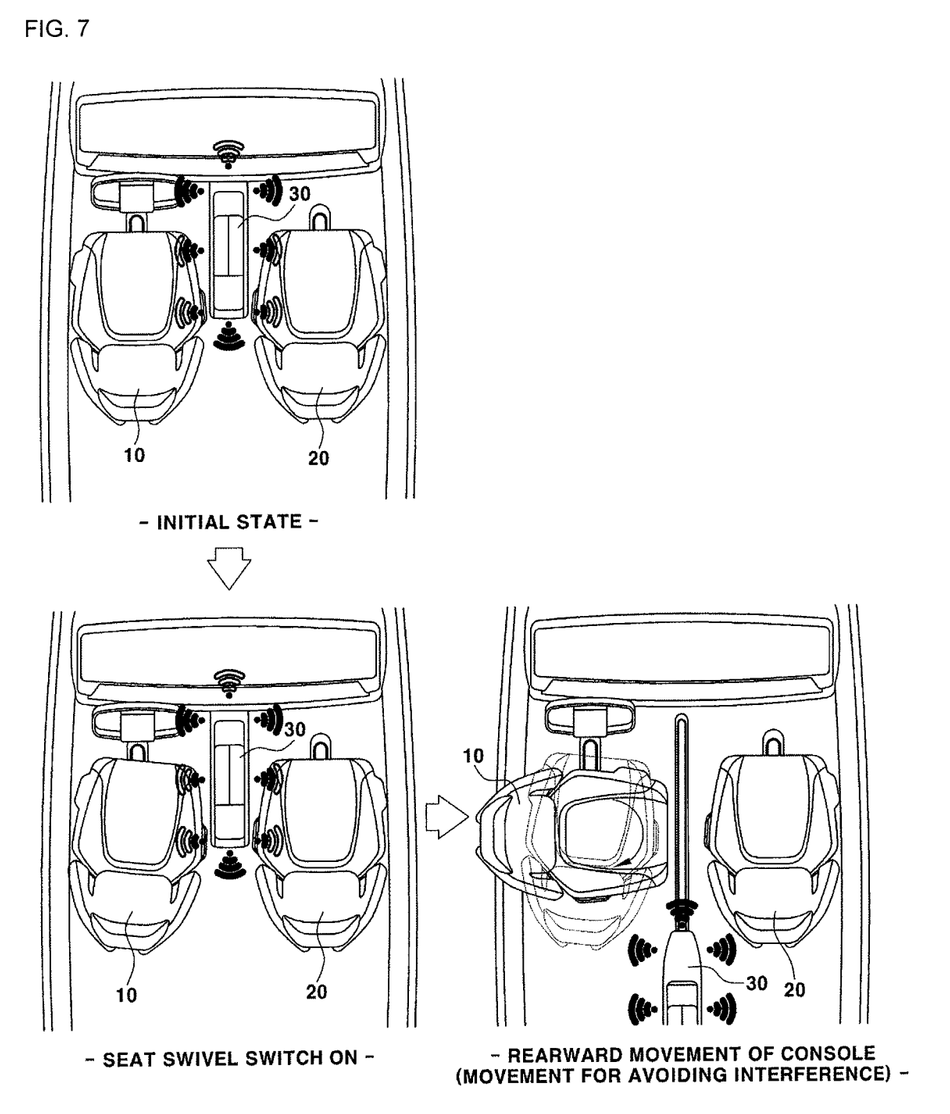
FIG. 7 is a plan view showing an example in which the console is moved by the method of controlling the moving console of the self-driving vehicle according to the embodiment of the present disclosure.

FIG. 6 is a flowchart showing a method of controlling a moving console of a self-driving vehicle according to another embodiment of the present disclosure, and FIG. 7 is a plan view showing an example in which the console is moved by the method of controlling the moving console of the self-driving vehicle according to the embodiment of the present disclosure.

As can be seen from the initial state illustrated in FIG. 7, in the state in which the console 30 is disposed between the left seat 10 and the right seat 20, the distance sensors 32, mounted to the four side surfaces of the console 30, sense the distance between the console 30 and each of the seats 10 and 20 in real time, and transmit sensing signals to the controller 31.

In this state, the controller 31 determines whether the seat swivel switch 36 is ON or OFF (S201). Upon determining that the seat swivel switch 36 is ON, the controller 31 confirms the sensing signals of the distance sensors 32 (S202).

Subsequently, the controller 31 determines whether the distance between the console 30 and one of the seats 10 and 20 is within a predetermined swivel track range of the seat based on the sensing signals of the distance sensors 32 before the seat is swiveled (S203).

Upon determining that the console 30 is within the predetermined swivel track range of one of the seats 10 and 20 (in the case shown in FIG. 7, the console 30 is within the predetermined swivel track range of seat 10), the controller 31 applies a driving signal to the console forward and rearward movement motor 38 such that the console 30 is moved forwards or rearwards out of the predetermined swivel track range of the seat 10 or 20 (S204) that is swiveling.

Subsequently, the controller 31 continuously receives sensing signals of the distance sensors 32 when the console 30 is moved forwards or rearwards, and, upon determining that the console 30 is out of the predetermined swivel track range of each of the seats 10 and 20 (S205), performs control such that the console forward and rearward movement motor 38 is stopped (S206).

Meanwhile, upon determining that the console 30 is out of the predetermined swivel track range of the seat 10 or 20 as the result of the forward or rearward movement of the console 30, the controller 31 applies a driving signal to the seat swivel motor 16 in order to swivel the seat, whereby the seat is easily swiveled without interference with the console.

As described above, when the seat is swiveled, the console may be automatically moved out of the predetermined swivel track range of the seat, whereby it is possible to prevent contact between the seat and the console when the seat is swiveled, and therefore the seat may always be swiveled smoothly.

As is apparent from the foregoing, aspects of the present disclosure may have the following effects.

First, when a seat of the self-driving vehicle is moved forwards or rearwards and is thus displaced, the console may be automatically moved to a position adjacent to the displaced seat, whereby it is possible for a passenger on the seat to always conveniently use the console.

Second, when the seat is swiveled, the console may be automatically moved out of the swivel track range of the seat, whereby it is possible to prevent contact between the seat and the console when the seat is swiveled, and therefore the seat may always be swiveled smoothly.

The effects of the present disclosure are not limited to those mentioned above. It should be understood that the effects of the present technology include all effects that can be inferred from the foregoing description of the present technology.

The above detailed description illustrates the present technology. In addition, the foregoing describes exemplary embodiments of the present disclosure. The present technology may be used in various different combinations, changes, and environments. That is, variations or modifications can be made within the conceptual scope of the present disclosure, equivalents to the disclosure of the present technology, and/or the scope of technology and knowledge in the art to which the present technology pertains. The embodiments describe the best mode for realizing the technical concept of the present technology, and variations required for the concrete application and use of the present technology are possible. Therefore, the above detailed description does not limit the present technology disclosed above. In addition, the appended claims should be interpreted to include other embodiments.

What is claimed is:

1. A system for controlling a moving console of a vehicle, the system comprising:
    a console mounted to a console rail so as to be movable forward and rearward;
    a distance sensor mounted to a side surface of the console for sensing a distance between the console and the seat;
    a seat forward and rearward movement motor configured to be driven under control of a controller when a seat forward and rearward movement switch is turned on in order to move a seat forward and rearward;
    a seat swivel motor configured to be driven under the control of the controller when a seat swivel switch is turned on in order to swivel the seat; and
    a console forward and rearward movement motor configured to be driven under the control of the controller in order to move the console forward and rearward, wherein
    when the seat is moved forward or rearward as a result of driving of the seat forward and rearward movement motor, the console is automatically moved forward or rearward to a position such that a distance between the console and the seat is maintained within a predetermined distance as a result of driving of the console forward and rearward movement motor under the control of the controller, and
    when the seat is swiveled as a result of driving of the seat swivel motor, the console is automatically moved forward or rearward to a position at which interference between the console and the seat is avoidable as a result of driving of the console forward and rearward movement motor under the control of the controller,
    wherein the controller receives an ON signal of the seat forward and rearward movement switch and a sensing signal of the distance sensor in real time, and, upon determining that the distance between the console and the seat is equal to or greater than a reference distance, applies a driving control signal to the console forward and rearward movement motor in order to move the console forward or rearward,
    wherein the controller receives an ON signal of the seat swivel switch and a sensing signal of the distance sensor in real time, and, upon determining that the distance between the console and the seat is within a predetermined swivel track range of the seat, applies a driving control signal to the console forward and rearward movement motor in order to move the console forward or rearward.

2. The system according to claim 1, wherein the controller receives the sensing signal of the distance sensor when the console is moved forward or rearward, and, upon determining that the distance between the console and the seat is within the reference distance, performs control such that the console forward and rearward movement motor is stopped.

3. The system according to claim 1, wherein the controller receives the sensing signal of the distance sensor when the console is moved forward or rearward, and, upon determining that the console is out of the predetermined swivel track range of the seat, performs control such that the console forward and rearward movement motor is stopped.

4. The system according to claim 1, wherein the distance sensor comprises a plurality of distance sensors mounted to four side surfaces of the console.

5. A method of controlling a moving console of a vehicle, the method comprising:
    sensing a distance between a console and a seat and transmitting a sensing signal to a controller;
    transmitting an ON signal of a seat forward and rearward movement switch to the controller;
    applying, by the controller, a driving signal to a seat forward and rearward movement motor based on the ON signal of the seat forward and rearward movement switch such that the seat is moved forward or rearward; and
    upon determining that the distance between the console and the seat is equal to or greater than a reference distance based on the sensing signal, applying, by the controller, a driving signal to a console forward and rearward movement motor such that the console is moved forward or rearward to a position adjacent to the seat that has already been moved forward or rearward,
    wherein the controller receives the sensing signal when the console is moved forward or rearward, and, upon determining that the seat is within the reference distance from the console, performs control such that the console forward and rearward movement motor is stopped,
    wherein the sensing a distance between the console and a seat is performed by a plurality of distance sensors mounted to four side surfaces of the console.

6. A method of controlling a moving console of a vehicle, the method comprising:
    sensing a distance between a console and a seat and transmitting a sensing signal to a controller;
    transmitting an ON signal of a seat swivel switch to the controller;
    determining, by the controller, whether the distance between the console and the seat is within a predetermined swivel track range of the seat based on the sensing signal;
    upon determining that the distance between the console is within the predetermined swivel track range of the seat, applying, by the controller, a driving signal to a console forward and rearward movement motor such that the console is moved forward or rearward out of the predetermined swivel track range of the seat; and upon determining that the console is out of the predetermined swivel track range of the seat as a result of forward or rearward movement of the console, the controller applying a driving signal to a seat swivel motor in order to swivel the seat, wherein the controller receives the sensing signal when the console is moved forward or rearward, and, upon determining that the console is out of the swivel track range of the seat, performs control such that the console forward and rearward movement motor is stopped, wherein the sensing a distance between the console and a seat is performed by a plurality of distance sensors mounted to four side surfaces of the console.

* * * * *